Patented Feb. 26, 1935

1,992,292

UNITED STATES PATENT OFFICE 1,992,292

PRESERVATION OF ORGANIC SUBSTANCES

Henry L. Cox, South Charleston, and Paul S. Greer, Charleston, W. Va., assignors to Carbide and Carbon Chemicals Corporation, a corporation of New York No Drawing. Application February 26, 1932, Serial No. 595,419

3 Claims. (Cl. 23—250)

This invention provides an improvement in the art of preserving certain organic substances.

A number of organic chemicals which were formerly comparatively unknown have recently assumed considerable importance in various fields. Among such substances with which the present invention is concerned may be listed the alkylene oxides, such as ethylene and propylene oxides; dialkylene dioxides, such as cyclic diethylene dioxide, aliphatic ethers having more than four carbon atoms in the molecule, for example, diisopropyl ether; substituted derivatives of aliphatic ethers, such as bis beta-chloroethyl ether and bis-beta-hydroxyethyl ether; alkoxy alcohols, such as beta-butoxy ethanol or beta-ethoxy ethanol; and derivatives of alkoxy alcohols, such as beta-(beta-ethoxy ethoxy)-ethanol and beta-ethoxy-ethyl acetate.

Substituted derivatives of the above compounds other than those specifically mentioned are also included in this invention.

The foregoing organic substances have many varied applications some of which are intimately associated with foodstuffs, pharmaceutical preparations and the like. For such applications it is essential to prepare and to preserve these substances in a state of extreme purity. For example, beta-methoxy ethanol is widely used as a sealing agent in connection with moistureproof packaging materials for foodstuffs and the like. For this use the sealing agent must necessarily be very pure to avoid contamination of the material being packaged.

The original state of purity of the compounds of this invention can be adequately controlled by the processes by which they are made, but because of the nature of these substances it is not always possible to preserve, store, and ship them in the original state because these compounds have the peculiar property of suffering spontaneous deterioration with the formation of difficultly removable deleterious impurities.

It is common and almost universal practice to use glass containers for substances which are to be preserved in a state of extreme purity. The unique characteristics of the substances with which this invention is concerned is strikingly emphasized by the fact that these compounds have been found to deteriorate under ordinary storage conditions, even in glass containers.

The principal object of our invention is to provide an improvement in the art of preserving organic compounds of the group described which minimizes the spontaneous formation of deleterious impurities, and which preserves these compounds with less deterioration than occurs under ordinary conditions of storage even in glass containers.

We have discovered that the object of our invention may be achieved by subjecting the substance to be preserved to the action of a preserving agent selected from the group consisting of metallic copper, aluminum, chromium, nickel, zinc, and cadmium, alloys of iron containing both chromium and nickel, manganese dioxide and cuprous oxide.

The manner in which the substances are kept is immaterial so long as they are in contact with and subjected to the action of a preserving agent selected from the foregoing group. This may be done by forming the entire container from a material which is a preserving agent; by providing a surface of a preserving agent over all or part of the interior of an ordinary container; by adding a quantity of a preserving agent to the substances to be preserved in an ordinary container, such as a glass container; or by any other convenient method of providing a preserving agent in contact with the substance to be preserved. It is of particular interest to note that not only are the above enumerated compounds preserved by our invention without the formation of objectionable quantities of deleterious impurities, but compounds which originally contain impurities formed by spontaneous deterioration in many cases contain less impurities after having been stored in accordance with our invention, and in all cases the compounds may be preserved better by our invention than in glass containers.

The following examples illustrate our invention:

1. Identical samples of beta-(beta-ethoxy ethoxy)-ethanol free from impurities were stored in contact with each of the following: metallic copper, aluminum and cadmium, and an iron alloy containing about 18% chromium and about 8% of nickel. An identical sample was also stored in a plain glass bottle. After standing for over 50 days the sample stored in glass showed a marked content of impurities, while the other samples were substantially in their original condition. The other preserving agents of our invention have no particular effect upon beta-(beta-ethoxy ethoxy)-ethanol.

2. Identical samples of pure beta-ethoxy ethanol were stored in contact with metallic copper, metallic chromium, manganese dioxide, and cuprous oxide, and in a plain glass bottle. After standing for from 35 to 175 days, the sample in the plain glass container was badly contaminated with impurities, while the other samples were substantially in their original state of purity. The other preserving agents of our invention have no particular effect upon beta-ethoxy ethanol.

3. Three identical samples of pure beta-ethoxy ethyl acetate were stored in containers formed from nickel, and iron alloy containing about 18% chromium and 8% nickel, and plain glass respectively. After about 60 days the sample kept in glass was badly contaminated with impurities, while the other two samples were unchanged. The other preserving agents mentioned have no particular effect upon this compound, however, copper should not be used in connection with beta-ethoxy ethyl acetate because it is slightly attacked thereby.

4. Identical samples of pure bis-beta-chloroethyl ether were stored in contact with metallic copper, metallic aluminum, and in a plain glass bottle. After standing for more than 160 days the sample in the glass bottle was found to be contaminated with impurities while the other two samples were unchanged. Other preserving agents of the group described have no particular effect upon this compound.

Bis-beta-hydroxyethyl ether exactly follows bis-beta-chloroethyl ether.

5. Identical samples of pure cyclic diethylene dioxide were stored in contact with metallic copper, metallic aluminum, metallic chromium, metallic zinc, and in a plain glass bottle. After more than 80 days of storage, the sample stored in glass was very badly contaminated with impurities, while the other samples were unchanged. The other preserving agents described had no particular effect upon this substance.

6. Ten identical samples of pure diisopropyl ether were stored in contact with metallic copper, aluminum, chromium, nickel, zinc, and cadmium; and iron alloy containing about 18% chromium and about 8% nickel; manganese dioxide and cuprous oxide; and in a plain glass bottle respectively. After storage for a considerable length of time, the sample in the plain glass bottle was badly contaminated with impurities, while the samples preserved in accordance with our invention were not appreciably changed.

7. Identical samples of pure propylene oxide were stored in contact with metallic aluminum and in a plain glass bottle. After about 175 days of storage the sample in the plain glass bottle was badly contaminated with impurities, while the sample in contact with aluminum was not appreciably changed.

The results of the foregoing tests clearly demonstrate the advantage of our invention in preserving organic substances which are subject to spontaneous deterioration with the formation of difficultly removable impurities.

A test which shows that our invention is effective to diminish the content of impurities in a material is as follows:

Two identical samples of bis-beta-chloroethyl ether which contained traces of impurities were stored in a plain glass bottle and a container formed of copper respectively. After 7 days the sample in glass was substantially unchanged, while the content of impurities in the sample stored in the copper container was diminished so that no impurities could be detected by test. After 21 days of storage the sample in the glass container showed a marked increase of impurities, while the sample stored in the copper container was still free from impurities.

We claim:

1. The improvement in preserving beta-alkoxy ethanols, which substances tend to deteriorate under ordinary storage conditions even in glass containers, which consists in subjecting the substances to be preserved to the action of a preserving agent selected from the group of metallic copper, aluminum, chromium, nickel and cadmium; iron alloys containing both chromium and nickel; and manganese dioxide and cuprous oxide, whereby to diminish the content of detrimental impurities.

2. The improvement in preserving beta-(beta-ethoxy ethoxy)-ethanol, which substance tends to deteriorate under ordinary storage conditions even in glass containers, which consists in subjecting the beta-(beta-ethoxy ethoxy)-ethanol to the action of a preserving agent of the group consisting of metallic copper, aluminum, and cadmium, and iron alloys containing about 18% chromium and about 8% nickel, whereby to diminish the content of detrimental impurities.

3. The improvement in preserving beta-ethoxy ethanol, which substance tends to deteriorate under ordinary storage conditions even in glass containers, which consists in subjecting the beta-ethoxy ethanol to the action of a preserving agent of the group consisting of metallic copper and chromium, manganese dioxide and cuprous oxide, whereby to diminish the content of detrimental impurities.

HENRY L. COX.
PAUL S. GREER.